Dec. 10, 1946.   H. J. ZIMMERMANN   2,412,378
ENGAGING AND DISENGAGING MERCURY CLUTCH
Filed Feb. 24, 1944     4 Sheets-Sheet 1

Inventor
Hans J. Zimmermann
By Frease and Bishop
Attorneys

Dec. 10, 1946. H. J. ZIMMERMANN 2,412,378
ENGAGING AND DISENGAGING MERCURY CLUTCH
Filed Feb. 24, 1944 4 Sheets-Sheet 2

Inventor
Hans J. Zimmermann
By Frease and Bishop
Attorneys

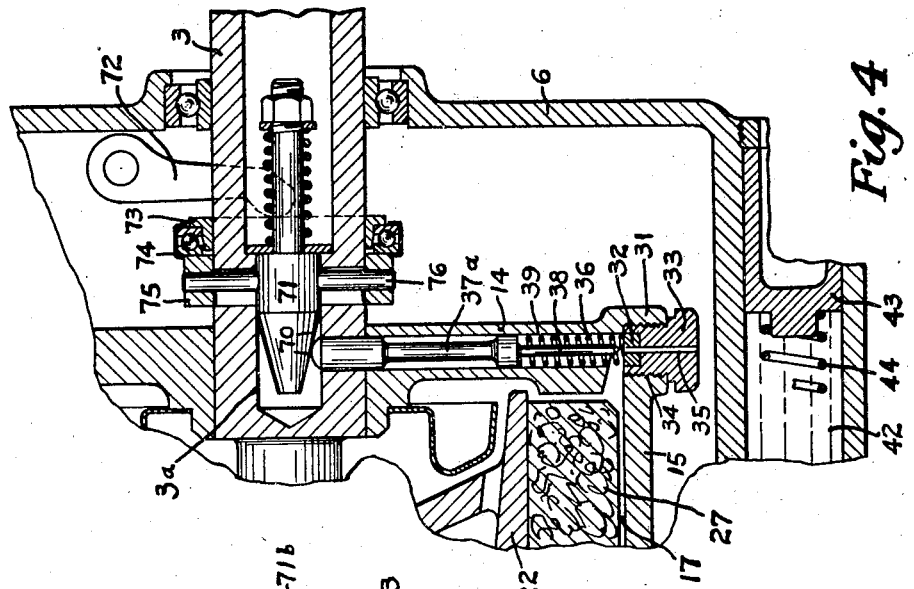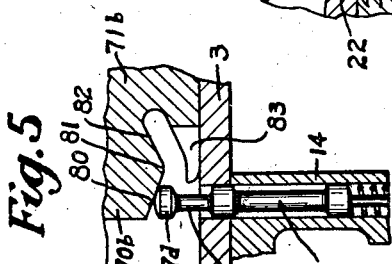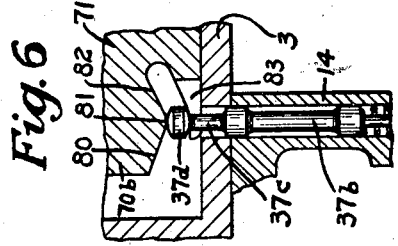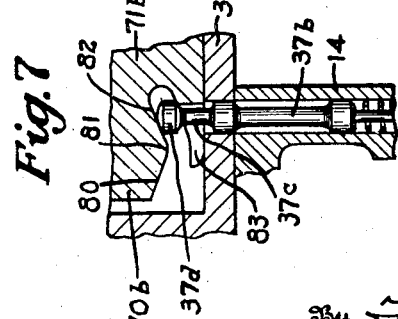

Patented Dec. 10, 1946

2,412,378

UNITED STATES PATENT OFFICE 2,412,378

ENGAGING AND DISENGAGING MERCURY CLUTCH

Hans J. Zimmermann, Canton, Ohio, assignor to Mercury Clutch Corporation, Canton, Ohio, a corporation of Ohio Application February 24, 1944, Serial No. 523,667

16 Claims. (Cl. 192—85)

The invention relates to clutches and more particularly to a liquid, preferably mercury, actuated clutch and to the control of the engagement and disengagement of such a clutch while the driving member thereof is running.

Clutches of the liquid type in which a body of liquid, preferably mercury, is used for effecting a driving connection between a driving member and a member to be driven are shown in the Kohl Patents Nos. 1,972,741, 2,258,157, 2,283,267 and 2,307,797.

In order to disengage such a clutch while the driving member is rotating and the driven member is being driven, it is necessary to relieve the pressure of the body of mercury which establishes the driving connection. The best way to relieve this pressure to disengage the clutch while it is running, is to remove the mercury from the liquid driving chamber wherein the driving connection is established by the mercury.

The Kohl Patent No. 2,307,797 provides for such disengagement and mercury removal by a scooping device which moves to a position to transfer the mercury from the driving chamber to a storage chamber. However, difficulties are encountered in operating such devices when the engaged parts are running at high speed, because the impact of the rotating body of mercury upon the scooping device is exceedingly high and may damage the mechanism for operating the scooping device unless the mechanism is ruggedly constructed. However, the limitations of space may prevent a rugged construction of the scooping device in small sized, high speed, mercury clutches.

Another way of removing the mercury from the driving chamber while the clutch is running is to provide a valve for permitting the escape of mercury from the driving chamber. However, it is quite difficult to provide a satisfactory construction for mechanically operating such a valve while the clutch is running at high speed, and the prior art does not provide any satisfactory valve operating construction.

Some of these difficulties also arise in operating the engaging means for such a clutch while the driving member is rotating.

There are many uses for a clutch which may be engaged and disengaged while the driving member is rotating, such as in a Diesel engine-compressor installation, where it may be desired to stop and start the compressor. In such an installation it is usually desired to permit the Diesel engine to idle rather than to be stopped, upon stopping the compressor. The same conditions prevail in the operation of farm machinery, machine tools, marine engines, etc., where it may be desired to stop and start the driven member frequently without stopping the motor or driving member.

For example, the engine, motor or driving member may have a normal operating speed of up to say 2500 to 2600 R. P. M. and an idling speed of say 400 to 500 R. P. M., and it may be desired to engage the clutch at any speed above idling speed of the driving member and to disengage the clutch by reducing the speed of the driving member to idling speed.

Accordingly, it is an object of the present invention to provide a liquid actuated clutch with means for disengaging the clutch while running whenever the speed of the driving member is reduced to a predetermined minimum or idling speed.

Also, it is an object of the present invention to provide a liquid actuated clutch with means for engaging the clutch while the driving member is running, at any time that the speed of operation of the driving member is above a predetermined minimum or idling speed.

Likewise, it is an object of the present invention to provide for removing or introducing mercury from or into the driving chamber of a mercury clutch while the clutch is running, without impact upon the mercury controlling devices.

It is a further object of the present invention to provide a liquid, preferably mercury, actuated clutch with means for releasing and draining the mercury from the driving chamber to accomplish disengagement of the clutch while the clutch is running, automatically whenever the speed of the clutch or its driving member is reduced to a predetermined minimum or idling speed.

Also, it is an object of the present invention to provide a liquid actuated clutch with means for automatically releasing the liquid from the driving chamber at a predetermined speed, the operation of which means is controlled by centrifugal force developed during rotation of the clutch.

Likewise, it is an object of the present invention to provide a liquid, preferably mercury, actuated centrifugal clutch with means for automatically draining the mercury to a reservoir from the driving chamber to disengage the clutch while the clutch is running; and also with means for introducing the mercury from the reservoir into the driving chamber to reengage the clutch while the driving member is running.

Further, it is an object of the present invention to provide spring loaded valve means for releasing the liquid from a liquid actuated clutch carried by one of the rotating clutch members and operative to automatically open whenever the speed of the clutch is reduced to a predetermined speed and also operative to be maintained closed by the action of centrifugal force whenever the member carrying the spring loaded valve means is rotated above said predetermined speed.

Also, it is an object of the present invention to provide a centrifugal, liquid actuated, preferably mercury, clutch, which may be engaged or disengaged while the clutch is running and in which the operation of the engaging means and the disengaging means is unaffected by the pressure of the liquid in the driving chamber.

Finally, it is an object of the invention to provide an engaging and disengaging mercury clutch which is extremely simple in construction, durable and effective in operation, and relatively inexpensive to manufacture.

These and other objects and advantages apparent to those skilled in the art from the following description and claims may be obtained, the stated results achieved, and the described difficulties overcome, by the devices, constructions, arrangements, combinations, sub-combinations, parts, and elements which comprise the present invention, the nature of which is set forth in the following general statement, preferred embodiments of which—illustrative of the best mode in which the applicant has contemplated applying the principle—is set forth in the following description and shown in the drawings, and which are particularly and distinctly pointed out and set forth in the appended claims forming part hereof.

The nature of the improvements in engaging and disengaging clutches of the present invention may be stated in general terms as preferably including in a centrifugal, liquid actuated, preferably mercury, clutch wherein cooperatively arranged driving and driven members are formed with a liquid driving chamber in which liquid, preferably mercury, is thrown centrifugally outwardly upon rotation of one of the members to establish a driving engagement between the members—spring loaded valve means mounted in one of the members controlling a passage leading from the liquid driving chamber and including a valve seat, a valve stem, valve loading means, and spring means, constructed and arranged such that the spring means maintains the valve stem unseated whenever the speed of rotation of its mounting member is reduced to a predetermined minimum or idling speed, and such that the action of centrifugal force moves the valve loading means to seat the valve stem in the valve seat whenever the speed of rotation of said member is above said predetermined minimum or idling speed, whereby any liquid contained in the liquid driving chamber is drained through said passage to reservoir means upon unseating of the valves during operation of the clutch to disengage the clutch; and means for passing fluid collected in the reservoir means to the liquid driving chamber for engaging the clutch.

By way of example, preferred embodiments of the improved clutch are illustrated in the accompanying drawings forming part hereof, wherein Figure 1 is a vertical section of a clutch incorporating the improvements of the present invention, taken as on the line 1—1, Fig. 2;

Figs. 4, 5, 6 and 7 illustrate further modified forms of construction.

Similar numerals refer to similar parts throughout the drawings.

Figure 1:
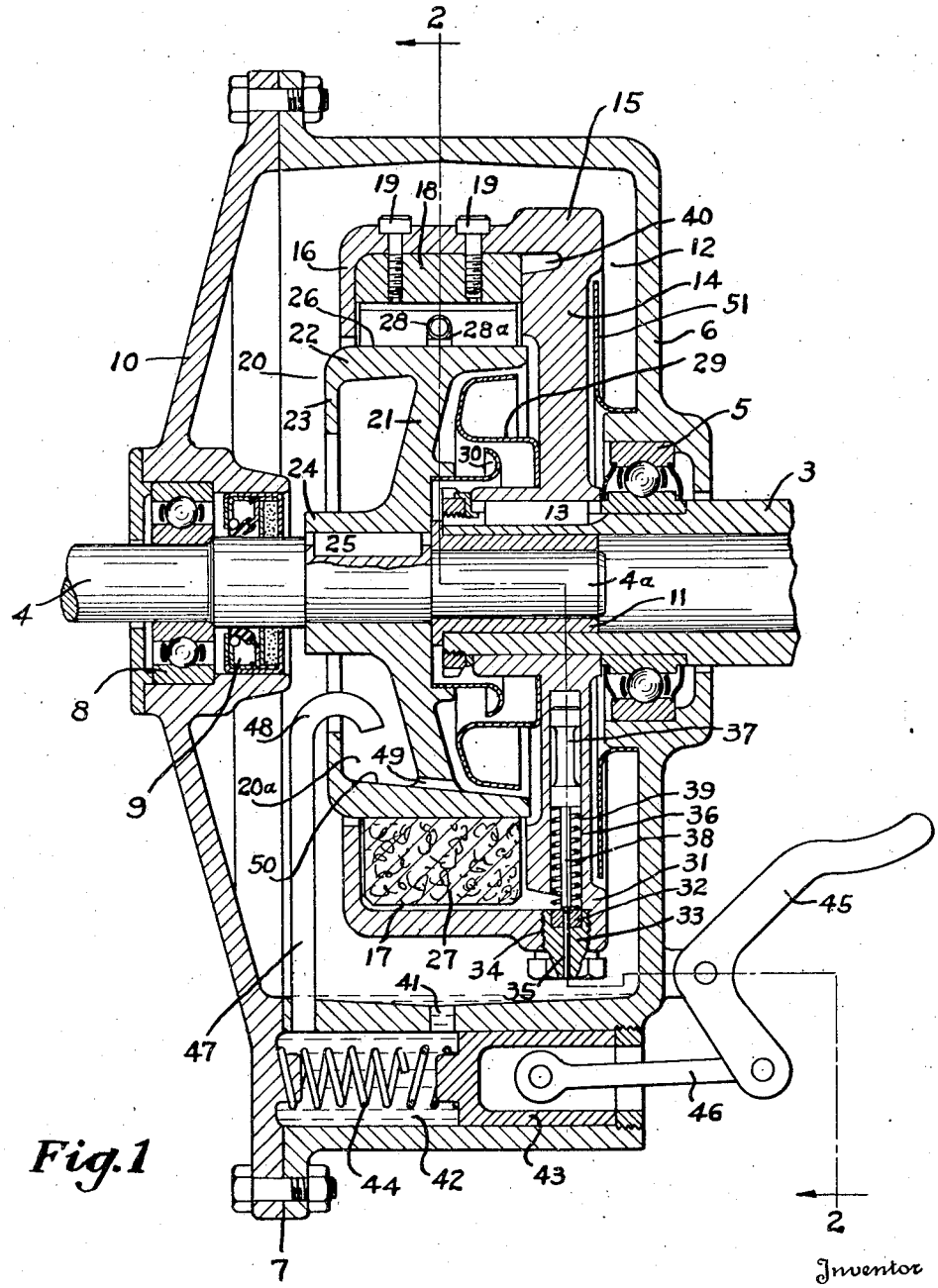
Figure 2:
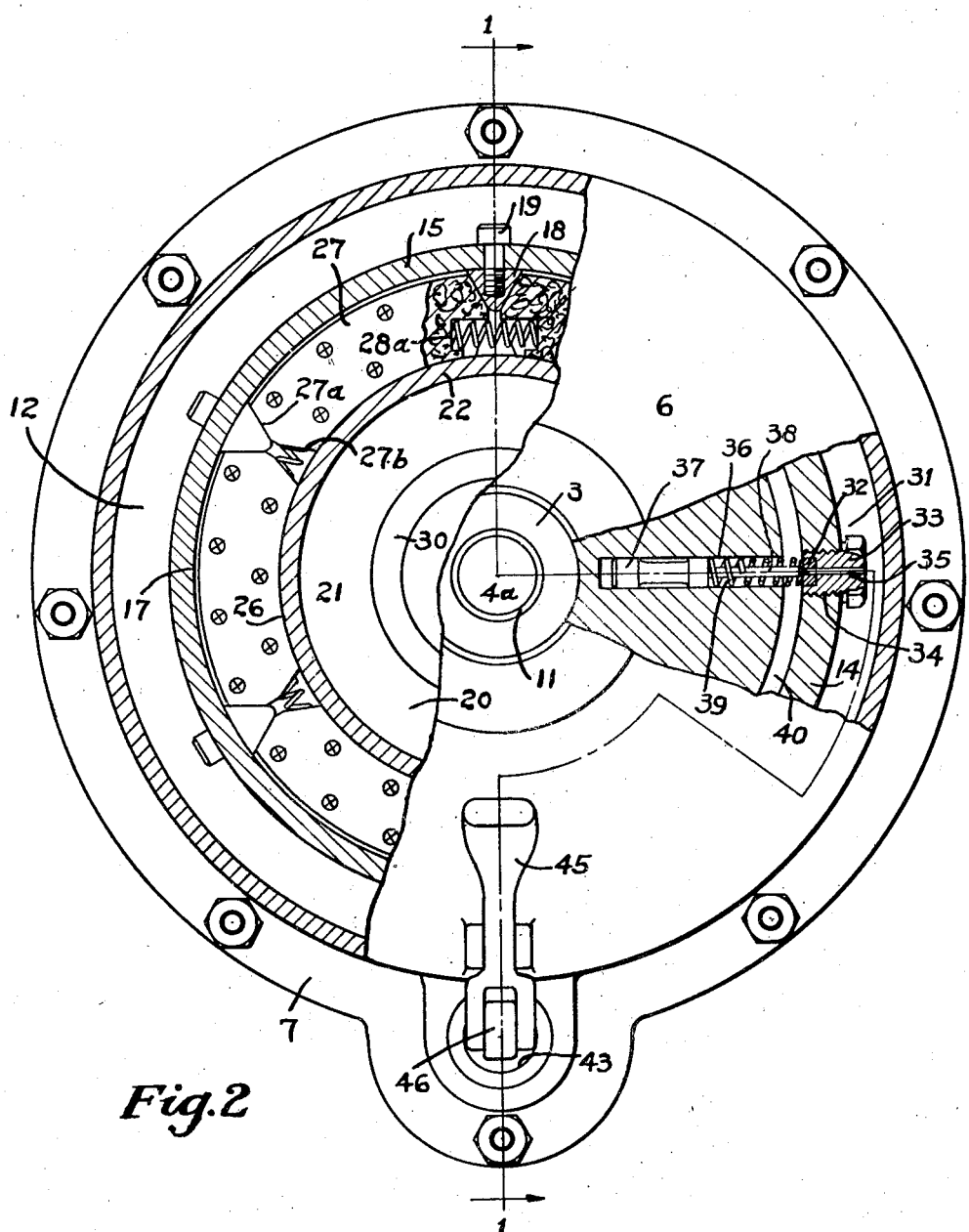
Fig. 2 is a section taken as on the line 2—2, Fig. 1.

Referring first to the construction shown in Figs. 1 and 2, the driving shaft extending to the clutch provided with the present improvements is indicated at 3, and the driven shaft is indicated at 4. The driving shaft 3 may be hollow and is journaled in a bearing 5 carried by stationary outer clutch casing 6, which may be split as indicated at 7 and provided with another bearing 8 in which the driven shaft 4 may be journaled. Sealing means 9 is carried in the end plate 10 of outer casing 6 adjacent the bearing 8 for sealing the bearing from the interior of the casing 6. The inner end 4a of the driven shaft 4 is preferably journaled in a bushing 11 provided within the interior of the hollow driving shaft 3 so that the driving and driven shafts 3 and 4 are co-axially arranged, mounted and journaled.

The clutch driving member generally indicated at 12 is mounted on and keyed at 13 to the driving shaft 3 and is therefore rotatable with the driving shaft. The driving member 12 comprises a housing having a disk-like wall 14, an outer annular wall 15 and an end flange wall 16 forming an annular liquid drive or pressure chamber 17. A series of circumferentially spaced lugs 18 are provided within the pressure chamber 17, by mounting triangularly shaped bars within the chamber 17 by screws 19.

The driven member of the clutch is generally indicated at 20 and is preferably formed as a pulley-like member having a web 21, an outer peripheral rim 22, an inwardly extending flange 23 at one end thereof, and a hub 24 keyed at 25 to driven shaft 4. The outer surface of the rim 22 of the driven clutch member 20 forms a continuous clutch surface 26; and a plurality of segmental members 27 are disposed between the clutch surface 26 and the outer annular wall or rim 15 of the driving member 12, within the liquid driving or pressure chamber 17 thereof.

The segmental members or clutch shoes 27 are formed of a material having a lower specific gravity than the liquid which is utilized for establishing the driving engagement; and each shoe 27 is disposed between two adjacent lugs 18. Springs 28 are preferably provided, reacting between the adjacent ends of shoes 27 as shown in Fig. 2, for so positioning the shoes 27 within the pressure chamber 17 that the driven member 20 may be readily inserted within the shoes 27 when assembling the clutch.

The liquid employed for establishing the driving engagement should have a higher specific gravity than the shoes 27 and mercury is preferably used. When mercury or liquid is within the pressure chamber 17 and the driving member 12 is rotated, the mercury is thrown outward by centrifugal force and assumes the form of an annulus. The buoyant action of the mercury, together with the pressure thereof due to centrifugal force, forces the shoes 27 inward into driving engagement with the outer surface 26 of the driven member 20, thereby driving the driven shaft 4. Shedder rings 29 and 30 are preferably provided, respectively, for the driving and driven clutch members 12 and 20.

The clutch parts thus far described are essentially the same as the various liquid actuated clutches shown in the four Kohl patents referred to above, in which driving engagement between the driving and driven clutch members is established upon rotation of one of the members by liquid thrown centrifugally outwardly into a liquid driving or pressure chamber formed in one of the members. The present improvements, now to be described, relate to improved engaging and disengaging means combined with such a liquid actuated clutch and to improvements in the clutch construction.

Driving engagement is established in the clutch shown whenever liquid is contained in the driving chamber 17 and the driving member 12 is rotated. In order to disengage the clutch, I have provided spring loaded valve means generally indicated at 31. One valve is shown in each of Figs. 1 and 2, but it is understood that a plurality of said valves are preferably provided, equally spaced radially in the disk-like portion 14 of the driving member 12.

Each disengaging valve means preferably includes a valve seat 32 carried by a plug 33 threaded into a threaded opening 34 in the driving member 12; and an interior passage 35 is formed in the plug 33 and valve seat 32. The passage 35 is preferably aligned with a bore 36 extending radially inwardly in the disk portion 14 of the driving member 12, and a valve loading or piston-like member 37 is slidably mounted in the bore 36 and has a valve stem 38 extending outwardly therefrom adapted to seat on valve seat 32 to close off the passage 35. A spring 39 reacts between the valve seat 32 and the valve loading member 37 tending normally to separate the parts.

The weight of the loading member 37 and valve stem 38 is so proportioned and the pressure of the spring 39 is so arranged, that the valve stem will be maintained unseated by the spring 39 until the speed of rotation of the driving member reaches a certain predetermined minimum speed, at which time the valve stem 38 will seat on seat 32. In other words, the pressure of the spring overcomes the pressure of centrifugal force imparted to the member 37 until the pressure of centrifugal force reaches a predetermined amount determined by a predetermined minimum speed of the driving member, such as an idling speed of say 400 to 500 R. P. M. of a Diesel engine. The valve loading member 37 is, however, actuated by centrifugal force to seat the valve stem 38 on the valve seat 32, when the speed of rotation of the driving member 12 is above said predetermined minimum speed.

Thus, when liquid is in the liquid driving chamber 17, and the clutch is operating at above the predetermined minimum speed, the liquid will be maintained within the driving chamber and will maintain the driving engagement between the driving and driven members.

However, whenever the speed of rotation of the driving member is reduced to the predetermined minimum speed, the valve means 31 automatically opens and the liquid in chamber 17 drains from the liquid driving chamber through annular passage 40 communicating therewith and thence through passages 35. Thus, the clutch is automatically disengaged upon reducing the speed of rotation of the clutch to said predetermined minimum speed.

The lower portion of the outer casing 6 is preferably provided with a drain opening 41 communicating with a cylinder 42 in which a piston 43 is mounted and normally maintained in the position shown in Fig. 1 by a spring 44. The piston may be actuated by any suitable means, a hand lever 45 and connecting rod 46 being shown. A pipe 47 extends within the housing 6 from the outer end of cylinder 42 upward, and is formed at its upper end with a goose neck 48 discharging into the interior of an annular channel 20a formed in driven member 20 between the web 21, flange 23 and rim 22 thereof. A plurality of apertures 49 are formed in the web 21 of the driven member 20 communicating with channel 20a whereby liquid discharged from the goose neck 48 will flow along the interior tapered surface 50 through said apertures in the rim 23 to the right hand edge thereof (Fig. 1) and will drain into and fill the liquid pressure or driving chamber 17 of the driving member 12.

The cylinder 42 acts as a reservoir within which is collected (as indicated in Fig. 1) the liquid which drains from the clutch when the same is automatically disengaged by reducing the speed thereof to a predetermined minimum speed. All that is necessary in order to re-engage the clutch, is to rotate the drive shaft 3 and therefore the driving member of the clutch, above the predetermined speed, whereby the valve means 31 closes; and to then transfer the liquid from the reservoir 42 to the liquid drive chamber of the clutch, by moving the piston 43 to the left. This operation of the piston closes drain opening 41 and forces the liquid from the cylinder 42 through pipe 47 and discharges the same into the clutch.

A shedder disk 51 is preferably provided between the clutch driving member 12 and the outer casing 6 around the bearing 5 to prevent liquid from collecting around the bearing 5.

In addition to the improved engaging and disengaging means for the liquid actuated clutch of the type shown herein, the arrangement shown also provides an improved and simplified clutch construction wherein the clutch driving member 12 is formed essentially as one piece with the annular pressure or driving chamber 17 therein; and the clutch driven member 20 is formed essentially as one piece, also with an annular liquid receiving chamber 20a therein, which communicates through passages 49 with the liquid driving chamber 17 when the members are assembled.

The liquid is discharged into chamber 20a in clutch driven member 20 and thence to chamber 17 in driving member 12 in order to simplify the construction and assembly of the parts; and the inner edge of flange 23 on member 12 serves as an overflow to limit the amount of mercury charged into chamber 17 in member 12. However, the driving shoes or segmental members 27 may be readily assembled within the driving chamber because of the tapered construction 27a and 27b at the ends, which permits the shoes 27 to be inserted individually into the driving chamber 17, and spaced by the lugs 18. The springs 28 are then introduced into the recesses 28a at the ends of each shoe 27 (Fig. 2) to properly position the shoes within the pressure chamber 17 and permit insertion of the driven member 20 within the driving member 12.

Figure 3:
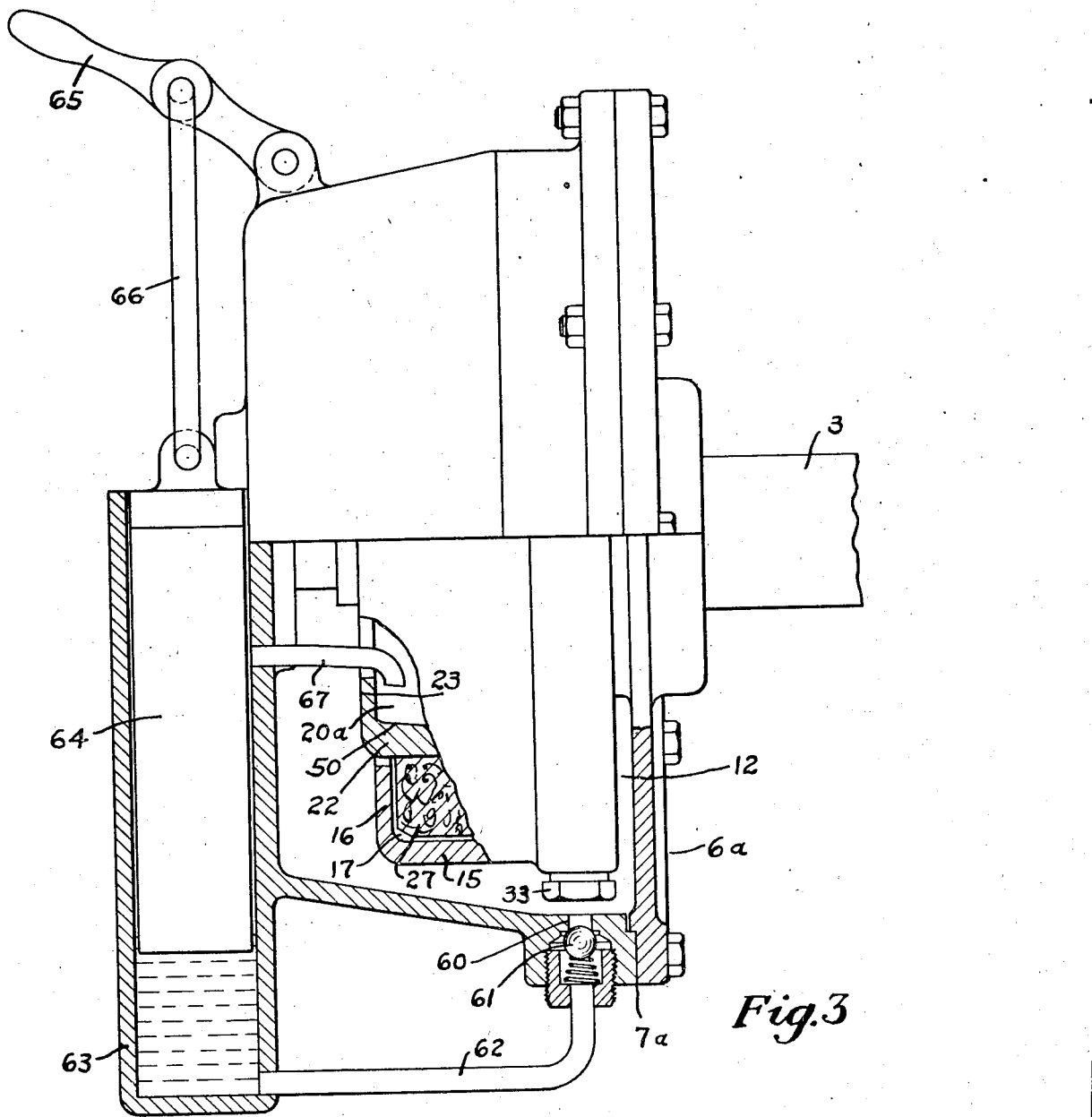
Fig. 3 is a view similar to Fig. 1 showing a modified form of construction.

In the embodiment of the invention shown in Fig. 3, there is a slightly modified means for engaging the clutch, the parts being otherwise the same. The clutch casing 6a is preferably split at 7a and is provided with an aperture 60, controlled by a spring pressed ball valve 61, communicating through pipe 62 with the bottom of a reservoir 63 mounted off center at one side of the casing 6a. The reservoir 63 is provided with a piston or plunger 64 operated by a hand lever 65 and connecting rod 66. Near the upper end of the reservoir 63, a pipe 67 leads into the interior of the casing and discharges into the liquid receiving chamber 20a of the driven member 20 of the clutch.

In operation, when the mercury drains from the clutch into the casing 6a, the weight of the same overcomes the spring pressure against ball check valve 61 and flows through opening 60 and pipe 62 to the reservoir 63, where it collects. In order to charge the clutch with mercury for engaging the clutch, the piston or plunger 64 is moved to the bottom of the reservoir 63, which displaces the mercury from the bottom of the reservoir to the top thereof above the plunger 64 whereby it drains through pipe 67 into the receiving chamber 20a of the clutch. In this form of construction, it is unnecessary to tightly fit or pack the plunger 64, as its operation only depends on displacing the mercury from the lower part to the upper part of the reservoir 63. Normally, the plunger, which is formed of material having a lower specific gravity than the mercury, will float on the mercury in the reservoir 63.

It is not intended to limit operation of the improved clutch to automatic or centrifugally controlled operation of the valves which trap the mercury in or release the mercury from the liquid driving chamber, because the valves may be operated by other means.

Thus, in Fig. 4, the valve loading member 37a may extend inward to within the central bore 3a of the driving member 3 where it may be engaged by the tapered end 70 of a spring retracted cam plunger 71. The plunger 71 may be operated by movement of bifurcated lever 72 which engages ring 73 on shaft 3 to push the plunger 71 to the left (Fig. 4) through thrust bearing 74, collar 75 and pin 76, for seating the valve stem 38 on valve seat 32.

The valve spring 39 may be only strong enough to keep the valve stem unseated when the clutch is rotating at or below the predetermined minimum speed as in the construction shown in Figs. 1 to 3, and to permit the valve to automatically close at any speed above the minimum speed. In such case, the valve may, however, be closed to permit the clutch to be engaged, at a speed below the selected minimum speed, by operating the lever 72 to move cam plunger 71 to the left and seat valve stem 38 on valve seat 32.

Alternately, the valve spring 39 may be strong enough to normally maintain the valve open at any speed of the clutch, and the clutch is then engaged or disengaged by operation of lever 72 to close the valve or permit the valve to open. In this construction, either the valve loading member actuated by centrifugal force, or the cam plunger, or both, function as the means for closing the valve; and the spring 39 functions to open the valve.

In Figs. 5, 6 and 7, a further modification of the valve loading member and cam plunger is shown for enabling automatic engagement and disengagement of the clutch, or engagement or disengagement at any speed. In this construction, the valve loading member 37b is provided at its inner end with a reduced portion 37c and a ball end 37d. The end 70b of cam plunger 71b is tapered in one direction at 80, is rounded at 81 and tapered in the other direction at 82. The cam plunger 71b is also provided with a bifurcated cam finger 83 which may engage under the ball end 37d of valve loading member 37b.

Thus, with the parts in the position shown in Fig. 5 and with the valve loaded with a spring as in Figs. 1, 2 and 3 to open the valve below a certain predetermined clutch speed, the clutch will disengage automatically as in Figs. 1, 2 and 3. Movement of the cam plunger 71b to the position shown in Fig. 6 will maintain the valve closed and therefore provide for clutch engagement when mercury is in the driving chamber. Thus, the clutch can be engaged and maintained engaged at any speed, by operation of the cam plunger to the position shown in Fig. 6.

The cam plunger may also be moved to the position shown in Fig. 7 which opens the valve, thus providing for disengagement of the clutch at any speed. In the construction shown in Figs. 5, 6 and 7, either the valve loading member, actuated by centrifugal force, or the cam plunger, or both, function as the means for closing the valve; and either the valve spring, or the cam plunger, or both, function to open the valve.

Accordingly, the present invention provides an improved engaging and disengaging liquid actuated clutch construction which overcomes the disadvantages and difficulties of prior art clutches; which disengages automatically upon reducing the speed thereof to a predetermined minimum or idling speed; which may be engaged when the driving member is running at any speed above said predetermined minimum or idling speed; which may be engaged or disengaged at any speed in addition to automatic engagement and disengagement; which avoids impact upon the liquid controlling device; which utilizes centrifugal force for controlling the disengaging means; and which is simple in construction, durable, effective and reliable in operation, and relatively inexpensive to manufacture.

The embodiments of the present improvements illustrated and described herein are by way of example and the scope of the present invention is not limited to the exact details of construction of the various parts.

For instance, the liquid used is preferably mercury because of the many advantages accruing by the use of this particular fluid which has a very high specific gravity, is stable under normal operating conditions, and is unaffected by and does not affect the working parts which it contacts. However, other high specific gravity liquids may be used without affecting the operation of the improved engaging and disengaging means.

Moreover, while a hand operated piston has been illustrated and described for transferring the liquid from the reservoir to the liquid driving chamber for engaging the clutch, the piston may be operated by other means as by a solenoid, or a diaphragm, or the application of pressure to the piston; or a pump such as a small centrifugal pump, may be connected with the reservoir to transfer the liquid therein to the liquid driving chamber of the clutch.

Finally, in the foregoing description certain terms have been used for brevity, clearness and understanding; but no unnecessary limitations are to be implied therefrom beyond the requirements of the prior art, because such words are utilized for descriptive purposes herein and not for the purposes of limitation, and are intended to be broadly construed.

Having now described the features of the invention, the construction, operation and use of preferred embodiments thereof, and the ad- vantageous, new and useful results attained by the improved construction; the new and useful devices, constructions, arrangements, combinations and sub-combinations, parts and elements, and reasonable mechanical equivalents thereof obvious to those skilled in the art, are set forth in the appended claims.

I claim:

1. In combination with a liquid actuated clutch wherein driving engagement between driving and driven members is established upon rotation of one of the members by liquid thrown centrifugally outwardly into a liquid driving chamber formed in one of the members, walls forming passage means leading from said chamber and communicating with a reservoir, and valve means for said passage means mounted on one of the members constructed and arranged to open automatically when the speed of rotation of the driving member is reduced to a predetermined minimum speed, whereby liquid drains from the liquid driving chamber to the reservoir to permit disengagement of the clutch automatically upon reducing the speed of rotation of the clutch to said predetermined minimum speed.

2. In combination with a liquid actuated clutch wherein driving engagement between driving and driven members is established upon rotation of one of the members by liquid thrown centrifugally outwardly into a liquid driving chamber formed in one of the members, walls forming passage means leading from said chamber and communicating with a reservoir, and valve means for said passage means mounted on one of the members constructed and arranged to be maintained closed by the action of centrifugal force when the speed of rotation of the driving member is above a predetermined minimum speed and to open automatically when the speed of rotation of the driving member is reduced to said predetermined minimum speed.

3. In combination with a liquid actuated clutch wherein driving engagement between driving and driven members is established upon rotation of one of the members by liquid thrown centrifugally outwardly into a liquid driving chamber formed in one of the members, walls forming passage means leading from said chamber and communicating with a reservoir, and spring loaded valve means for said passage means mounted on one of the members and including for each passage a valve seat, a valve stem, a valve loading member and a valve spring, the spring being tensioned to maintain the valve stem unseated when the speed of rotation of the driving member is below a predetermined minimum speed, and the valve loading member being actuated by centrifugal force to seat the valve stem on the valve seat when the speed of rotation of the driving member is above said predetermined minimum speed.

4. In a liquid actuated clutch construction wherein driving engagement between driving and driven members is established upon rotation of one of the members by liquid thrown centrifugally outwardly into a liquid driving chamber formed in one of the members, each of said members being formed in one piece with an annular chamber therein, one of said annular chambers being a liquid driving chamber and the other annular chamber being a liquid receiving chamber communicating with the liquid driving chamber, a casing in which said clutch is journaled, means for automatically releasing liquid from said driving chamber to said casing when the speed of rotation of the driving member is reduced to a predetermined minimum speed, and means for transferring liquid from said casing to said liquid driving chamber through said liquid receiving chamber.

5. In a liquid actuated clutch construction wherein driving engagement between driving and driven members is established upon rotation of one of the members by liquid thrown centrifugally outwardly into a liquid driving chamber formed in one of the members, each of said members being formed in one piece with an annular chamber therein, one of said annular chambers being a liquid driving chamber and the other annular chamber being a liquid receiving chamber communicating with the liquid driving chamber, a casing in which said clutch is journaled, means for automatically releasing liquid from said driving chamber to said casing when the speed of rotation of the driving member is reduced to a predetermined minimum speed, and means for transferring liquid from said casing to said liquid driving chamber through said liquid receiving chamber; said last mentioned means including a cylinder carried by said casing, piston means operatively mounted in the cylinder, passage means communicating between the casing and cylinder, passage means communicating between the cylinder and the liquid receiving chamber, and passage means communicating between the liquid receiving chamber and the liquid driving chamber.

6. In a mercury actuated clutch construction, a casing, coaxially arranged driving and driven shafts journaled in the casing, clutch driving and driven members mounted respectively on said driving and driven shafts, mercury actuated means establishing a driving engagement between the driving and driven members upon rotation of the driving member by mercury thrown centrifugally outwardly into a mercury driving chamber formed in one of the members, passage means formed in one of the members leading from said chamber and discharging into said casing, spring loaded valve means mounted on one of the members constructed and arranged to close said passage means when the speed of rotation of the driving member is above a predetermined minimum speed and to automatically open said passage means when the speed of rotation of the driving member is reduced to said predetermined minimum speed, a reservoir associated with said casing for collecting mercury released from said passage means, and means for transferring mercury from the reservoir to the driving chamber.

7. In a mercury actuated clutch construction, a casing, coaxially arranged driving and driven shafts journaled in the casing, clutch driving and driven members mounted respectively on said driving and driven shafts, said driving member having an annular mercury driving chamber formed therein and said driven member having an annular mercury receiving chamber formed therein, mercury actuated means establishing a driving engagement between the driving and driven members upon rotation of the driving member by mercury thrown centrifugally outwardly from said mercury receiving chamber into said mercury driving chamber, there being a passage formed in said driving member communicating with said driving chamber and discharging into said casing, spring loaded valve means mounted on said driving member constructed and arranged to close said passage when the speed of rotation of the driving member is above a predetermined minimum speed and to automatically open said passage when the speed of rotation of the driving member is reduced to said predetermined minimum speed, a reservoir associated with said casing for collecting mercury released from said driving chamber, and means for transferring mercury from the reservoir to the mercury receiving chamber in the driven member.

8. In combination with a mercury actuated clutch wherein driving engagement between driving and driven members is established upon rotation of the driving member by mercury thrown centrifugally outwardly into a driving chamber formed in the driving member—walls forming passage means leading from said chamber and communicating with a reservoir, spring loaded valve means for said passage mounted in the periphery of said driving member operative when closed to maintain mercury in said driving chamber and when open to permit mercury from said chamber to drain into said reservoir, means for opening and closing said valve means during rotation of the driving member, and means for transferring mercury from the reservoir to said driving chamber.

9. In combination with a mercury actuated clutch wherein driving engagement between driving and driven members is established upon rotation of the driving member by mercury thrown centrifugally outwardly into a driving chamber formed in the driving member—walls forming passage means leading from said chamber and communicating with a reservoir, radially movable valve means for said passage mounted in said driving member, and means for opening or closing said valve means during rotation of the driving member selectively to permit mercury in said chamber to drain into the reservoir or to maintain mercury in said driving chamber for establishing driving engagement between the driving and driven members.

10. In combination with a mercury actuated clutch wherein driving engagement between driving and driven members is established upon rotation of the driving member by mercury thrown centrifugally outwardly into a driving chamber formed in the driving member—an outer casing having a reservoir therein, means journalling the clutch in the casing, walls forming passage means leading from said chamber and communicating with the reservoir, valve means for said passage mounted in said driving member, means operative during rotation of the driving member to close the valve means and maintain the same closed for maintaining mercury in said driving chamber to establish driving engagement between the driving and driven members, and other means operative during rotation of the driving member to open the valve means and maintain the same open to permit mercury in said chamber to drain therefrom through said passage means into the reservoir, and means for transferring mercury from the reservoir to said driving chamber.

11. In combination with a mercury actuated clutch wherein driving engagement between driving and driven members is established upon rotation of the driving member by mercury thrown centrifugally outwardly into a driving chamber formed in the driving member—walls forming passage means leading from said chamber and communicating with a reservoir, valve means for said passage means mounted in said driving member constructed and arranged to be maintained closed by the action of centrifugal force when the speed of rotation of the driving member is above a predetermined minimum speed and to open automatically when the speed of rotation of the driving member is reduced to said predetermined minimum speed, means operative during rotation of the driving member at any speed to close the valve means and maintain the same closed, and other means operative during rotation of the driving member at any speed to open the valve means and maintain the same open.

12. In combination with a mercury actuated clutch wherein driving engagement between driving and driven members is established upon rotation of the driving member by mercury thrown centrifugally outwardly into a driving chamber formed in the driving member—an outer casing having a reservoir therein, means journalling the clutch in the casing, walls forming passage means leading from said chamber and communicating with the reservoir; spring loaded valve means for said passage means mounted in said driving member and including for each passage a valve seat, a valve stem, a valve loading member and a valve spring; means for closing the valve means to maintain mercury in said driving chamber for establishing driving engagement between the driving and driven members during rotation of the driving member, means for opening the valve means during rotation of the driving member to permit mercury in said chamber to drain therefrom through said passage means into the reservoir, and means for transferring mercury from the reservoir to said driving chamber.

13. In combination with a liquid actuated clutch wherein driving engagement between driving and driven members is established upon rotation of one of the members by liquid thrown centrifugally outwardly into a liquid driving chamber formed in one of the members, walls forming passage means leading from said chamber and communicating with a reservoir, valve means for said passage means mounted on one of the members, spring means operating the valve means to open the valve means when the speed of rotation of the driving member is reduced to a predetermined minimum speed and maintaining the valve means open when the driving member rotates at a speed below said predetermined speed, and centrifugally actuated means operative to overcome the effect of said spring means and to maintain the valve means closed when the speed of rotation of the driving member is above said predetermined speed.

14. In combination with a liquid actuated clutch wherein driving engagement between driving and driven members is established upon rotation of one of the members by liquid thrown centrifugally outwardly into a liquid driving chamber formed in one of the members—walls forming passage means leading from said chamber and communicating with a reservoir; and valve means for said passage means mounted on one of the members and including for each passage a valve seat and a movable valve stem, the valve means being so located and arranged that only portions of said valve seat and stem are exposed to the pressure of liquid in said driving chamber so that the operation of the valve means is not resisted by said liquid pressure.

15. In a mercury actuated clutch, driving and driven members, the driving member having an annular mercury driving chamber formed therein in which mercury is thrown centrifugally outwardly upon rotation of said driving member, mercury actuated means establishing driving engagement between the driving and driven members by the pressure of mercury thrown centrifugally outwardly in said driving chamber, there being a discharge passage formed in said driving member leading from said driving chamber for the discharge of mercury therefrom to disengage the clutch, and valve means mounted in the driving member including a valve seat and a movable valve stem for closing said passage means, the valve means being so constructed and arranged that only portions of said seat and stem are subject to the pressure of mercury in said driving chamber so that the operation of the valve means is not resisted by said mercury pressure.

16. In a clutch, the combination of driving and driven members, one of the members having a chamber therein, liquid actuated means establishing driving engagement between the driving and driven member by the pressure of liquid thrown centrifugally outwardly in said driving chamber, said chamber being provided with a discharge passage, valve means including a valve seat and a movable valve stem mounted in said one clutch member maintaining said passage closed by the rotation of said clutch member when its speed exceeds a predetermined rate, and the valve means being so constructed and arranged that only portions of said seat and stem are subject to the pressure of liquid in said chamber so that the operation of the valve means is not resisted by said liquid pressure.

HANS J. ZIMMERMANN.